United States Patent [19]

Werres

[11] Patent Number: 4,701,232

[45] Date of Patent: Oct. 20, 1987

[54] METHOD OF MANUFACTURING STRUCTURAL ELEMENTS

[75] Inventor: Willy Werres, Darmstadt, Fed. Rep. of Germany

[73] Assignee: Resopal Werk H. Römmler GmbH, Mannheim, Fed. Rep. of Germany

[21] Appl. No.: 860,678

[22] Filed: May 7, 1986

[30] Foreign Application Priority Data

May 10, 1985 [DE] Fed. Rep. of Germany ....... 3516862

[51] Int. Cl.⁴ ...................... B29C 53/04; B32B 27/42; B32B 31/20
[52] U.S. Cl. .................................. 156/211; 156/222; 156/289; 156/299; 156/307.7; 264/278; 264/295
[58] Field of Search ............... 156/293, 211, 289, 222, 156/307.7, 257, 299; 264/295, 278

[56] References Cited

U.S. PATENT DOCUMENTS

| | | | |
|---|---|---|---|
| 2,542,860 | 2/1951 | Clements | 156/211 |
| 2,648,370 | 8/1953 | Beach | 156/299 |
| 2,739,637 | 3/1956 | Tyler | 156/299 |
| 2,867,864 | 1/1959 | Githens | 156/211 |
| 3,215,579 | 11/1965 | Hagen | 156/289 |
| 3,418,189 | 12/1968 | Grosheim | 156/289 |

*Primary Examiner*—Michael Wityshyn
*Assistant Examiner*—Lori Cuervo
*Attorney, Agent, or Firm*—Herbert L. Lerner; Laurence A. Greenberg

[57] ABSTRACT

A method of manufacturing structural elements from decorative laminated molding materials includes forming a core from an inner layer and an outer layer, placing a decorative layer on the core, pressing the core and the decorative layer together, forming at least one recess in the outer layer, and deforming the structural element along the at least one recess after pressing.

5 Claims, 6 Drawing Figures

METHOD OF MANUFACTURING STRUCTURAL ELEMENTS

The invention relates to a method of manufacturing structural elements from decorative laminated molding materials, with a core and a decorative layer.

Such a method is applicable where structural elements for the interiors of houses, the manufacture of furniture and the inner linings of vehicles made of decorative molding laminates are manufactured.

European Patent No. 0 025 430, describes a method for the manufacture of laminated molded parts. When carrying out this method, stacks formed of several plastic laminate sheets which are deformable at elevated temperatures, are brought to the deformation temperature as individual layers or as sliding layers disposed between the individual layers, and are pressed in a molding tool. The stack substantially assumes the shape of the molded part. After the deformation, the individual layers forming the stack which are separated from each other by sliding layers, are connected to each other by a bonding agent. With this method, molded parts with a thickness of up to 10 mm can be fabricated.

It is accordingly an object of the invention to provide a method of manufacturing structural elements, which overcomes the hereinafore-mentioned disadvantages of the heretofore-known methods of this general type, and which permits self-supporting molded structural elements to be manufactured directly from decorative laminates which have any desired thickness.

With the foregoing and other objects in view there is provided, in accordance with the invention, a method of manufacturing structural elements from decorative laminated molding materials, which comprises forming a core from an inner layer and an outer layer, placing a decorative layer on the core, pressing the core and the decorative layer together, forming at least one recess in the outer layer, and deforming the structural element along the at least one recess after pressing.

The thickness of the decorative laminates used according to the method, is limited neither to large nor to small values. Since decorative molded plastic laminates with a thickness of less than 4 mm can still be processed into formed structural elements in accordance with conventional methods, the application of the method according to the invention only makes sense for molded laminates which are thicker than 4 mm.

With the method according to the invention, self-supporting structural elements can be manufactured. Carrying out the method requires only two operations. After the laminates are pressed into sheets, it is only necessary to deform them into the desired structural elements. It is not necessary to glue the pre-shaped elements to form the desired shaped part. According to the invention, the decorative plastic laminates can be prefabricated and processed immediately afterwards or at a later time to form the desired structural element. The prefabricated decorative plastic laminates can be stored in the meantime for as long as desired.

With the method according to the invention, shaped structural elements with rounded corners can be fabricated, which have a radius of curvature of less than 2 mm.

In accordance with another mode of the invention, there is provided a method which comprises forming the outer layer from a plurality of mutually separate and directly adjacent stacks, and forming the at least one recess after the pressing step by removing at least one of the stacks from the outer layer.

In accordance with a further mode of the invention, there is provided a method which comprises forming the stacks from soda kraft papers stacked on top of each other and impregnated with phenol resin.

In accordance with an added mode of the invention, there is provided a method which comprises forming the stacks from laminated pressed material sheets impregnated with incompletely hardened resin.

In accordance with an additional mode of the invention, there is provided a method which comprises separating the at least one stack to be removed, from adjacent stacks and from the inner layer by separating agents.

In accordance with again another mode of the invention, there is provided a method which comprises closely surrounding the entire length of the at least one stack to be removed with a wrapping formed of a material from the group consisting of polypropylene, polyamide and polyethylene, separating the at least one stack from adjacent stacks and from the inner layer.

In accordance with again a further mode of the invention, there is provided a method which comprises separating the at least one stack to be removed, from adjacent stacks and from the inner layer by a foil formed of a material from the group consisting of polypropylene, polyamide and polyethylene.

In accordance with again an added mode of the invention, there is provided a method which comprises aligning the longitudinal axis of the at least one stack to be removed parallel or perpendicular to the axes of adjacent stacks to be durably pressed to the inner layer.

In accordance with a concomitant mode of the invention, there is provided a method which comprises pressing and deforming the core and the decorative layer, i.e. the decorative laminated molding material, while supplying pressure and heat.

Other features which are considered as characteristic for the invention are set forth in the appended claims.

Although the invention is illustrated and described herein as embodied in a method of manufacturing structural elements, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which.

Figure 1:
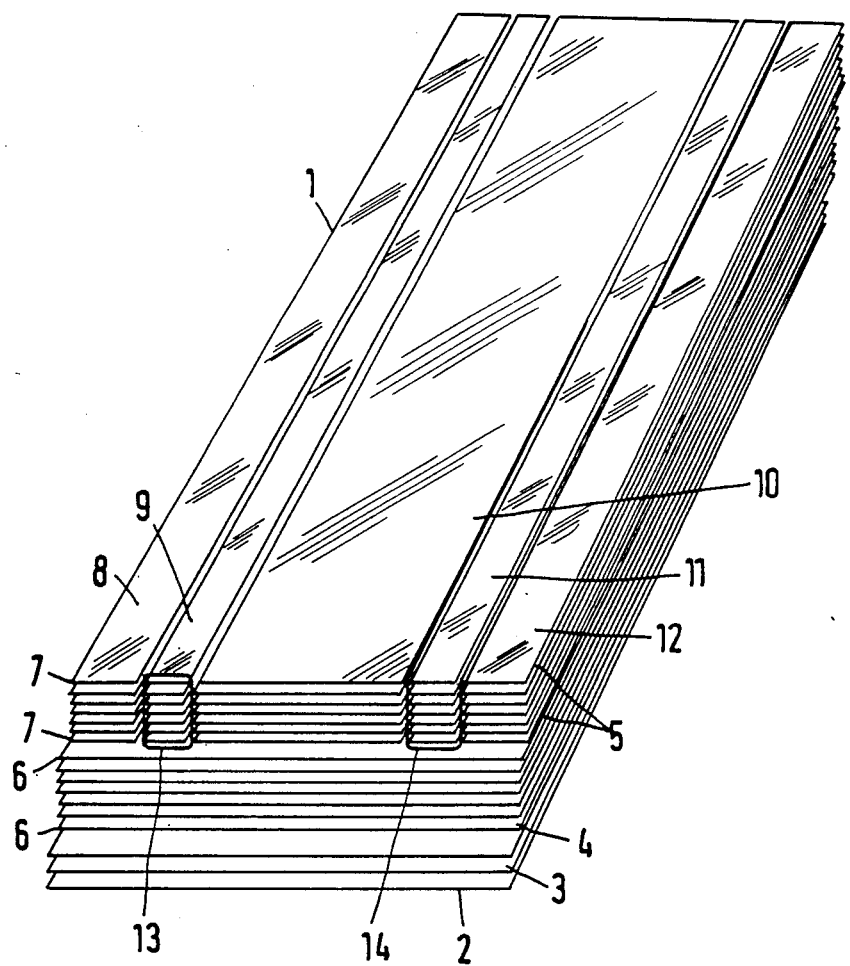
FIG. 1 is a diagrammatic perspective view of the structure of a decorative plastic laminate which is used for the manufacture of a shaped structural element.

Referring now to the figures of the drawing in detail and first, particularly, to FIG. 1 thereof, there is seen a decorative molding laminate 1 made in sheet form for carrying out the method according to the invention.

Figure 2:
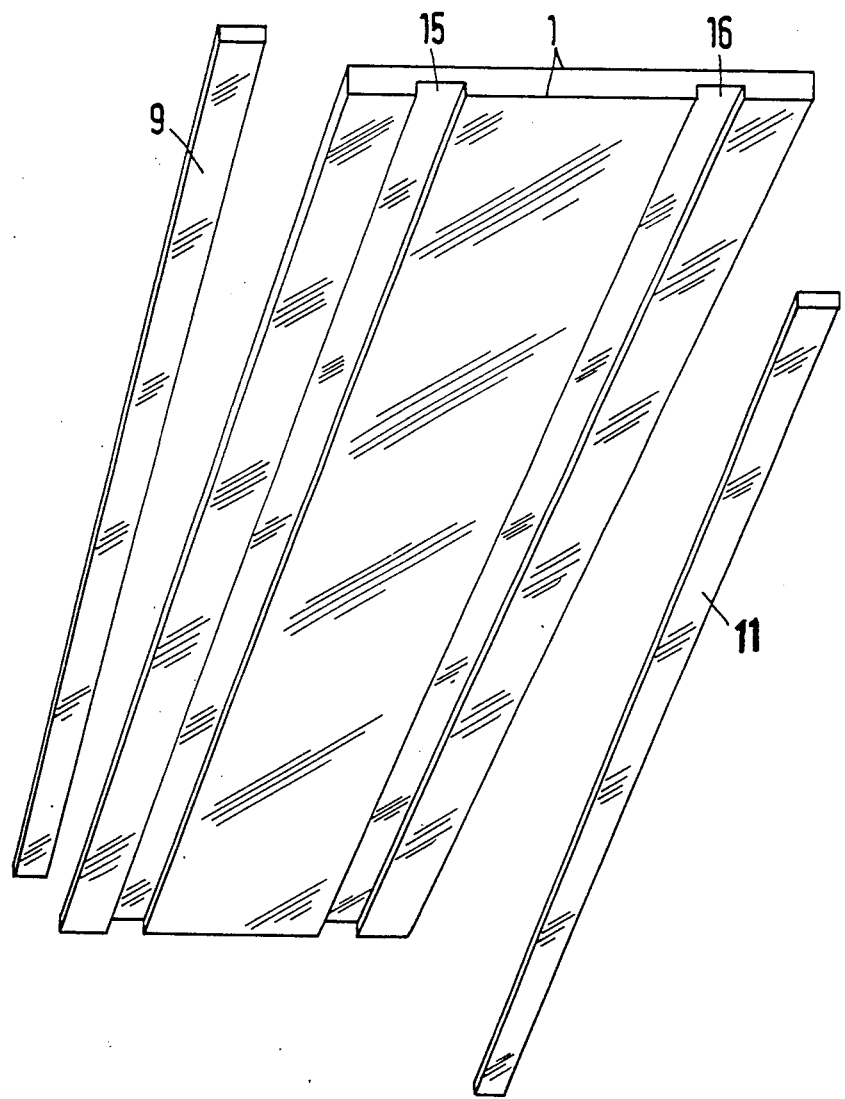
FIG. 2 is an exploded perspective view of the molded laminate shown in FIG. 1, after pressing.
Figure 3:
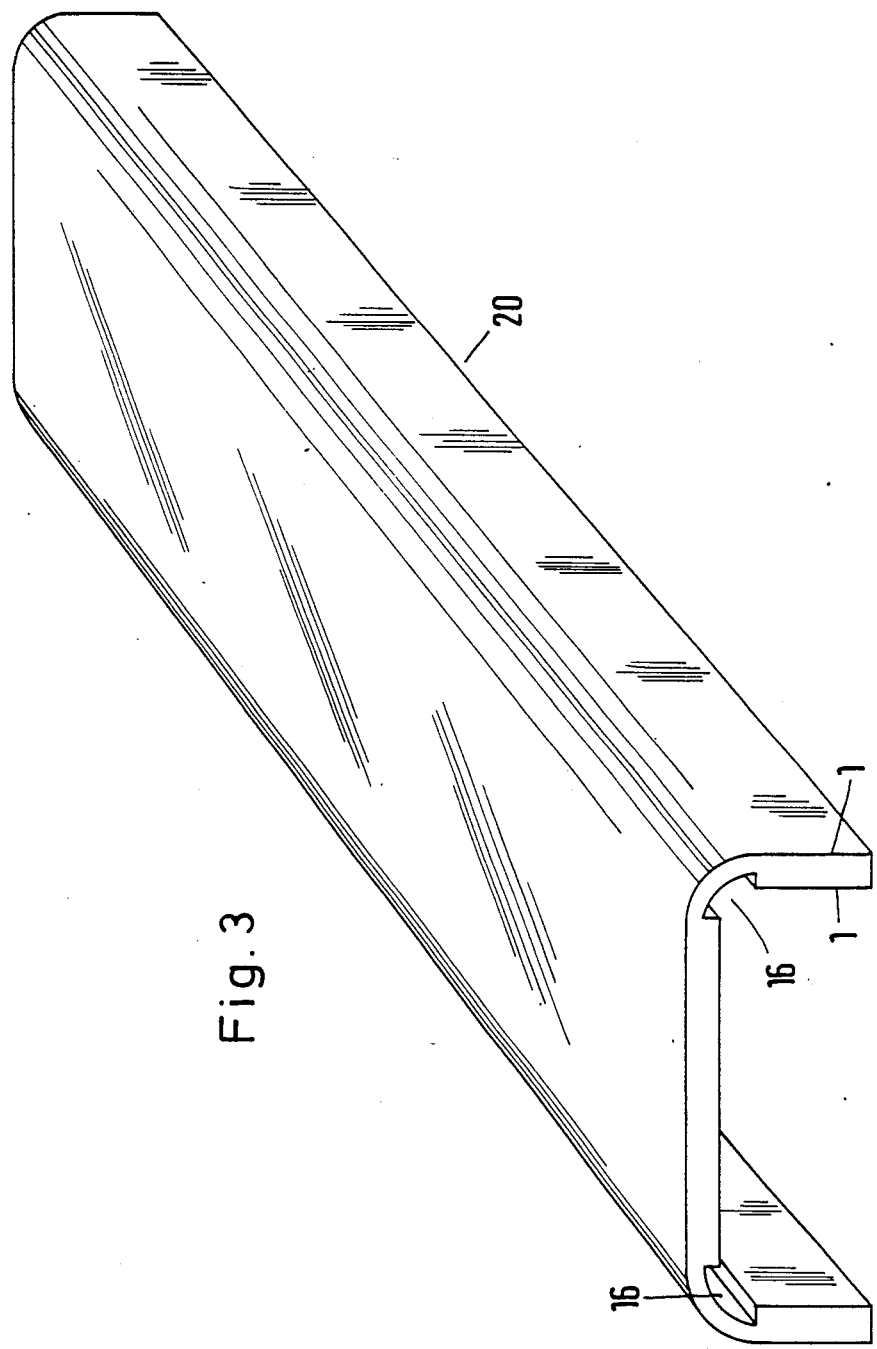
FIG. 3 is a perspective view of a self-supporting structural element made from the decorative laminated plastic according to FIG. 1.
Figure 4:
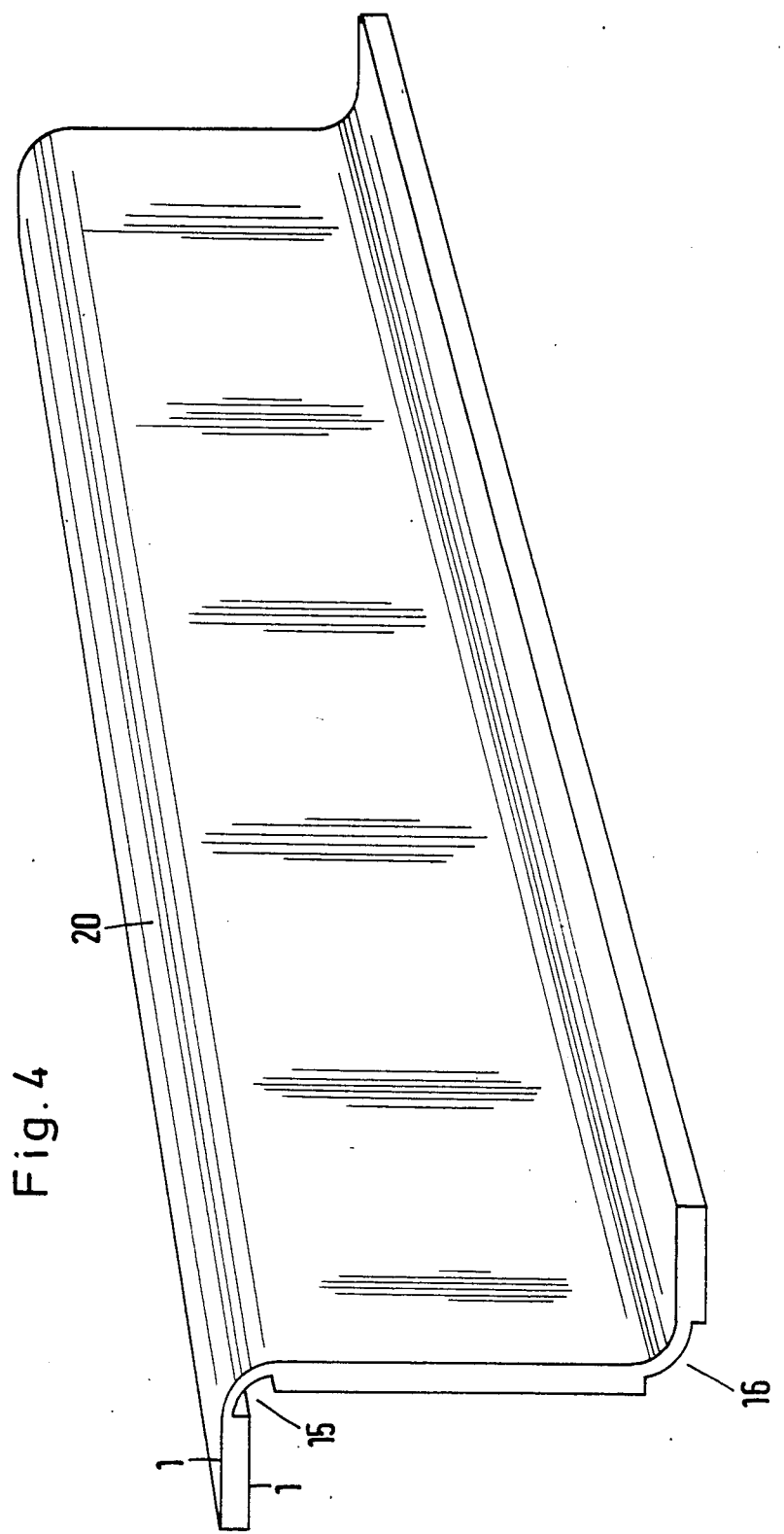
FIG. 4 is a perspective view of another structural element which is made from the decorative laminate shown in FIG. 2.

The molding laminate 1 is substantially formed of a decorative layer 2, 3, 4 including a transparent surface sheet or web 2 which later forms the surface of the structural element, a decorative sheet or web 3, a cover sheet or web 4 and a core 5. The transparent surface sheet 2 is formed of cellulose paper impregnated with a melamine resin. The decorative sheet 3 is a plain or solid color, a varied or mottled color or a printed paper web which is also impregnated with a resin, preferably an aminoplastic resin, the essential component of which is a melamine formaldehyde resin. The cover sheet 4 is also formed of paper and is impregnated with an aminoplastic resin. The purpose of the cover sheet 4 is to prevent the core 5 which has a dark brown color after pressing, from shining through to the top. In order to form self-supporting structural elements, the core 5 is subdivided, according to the invention, into an inner layer 6 and an outer layer 7. The inner layer 6 is formed of several webs of soda kraft paper which are stacked on top of each other and are impregnated with a phenolic resin. The inner layer 6 is followed by the outer layer 7 which, in the illustrated embodiment, is also formed of soda kraft paper impregnated with phenolic resin. However, in contrast to the formation of the inner layer 6, the outer layer 7 is not formed of coherent sheets of soda kraft paper, but rather of several stacks 8, 9, 10, 11 and 12 as shown in FIG. 1. The stacks are also formed of soda kraft paper webs which are stacked on top of each other and are impregnated with phenolic resin. The stacks 8 to 12 are separated from each other but are disposed on the inner layer 6 in such a manner that they adjoin each other directly. The dimensions of the stacks are chosen in such a way that the inner layer 6 underneath is completely covered by the stacks before pressing. The height of the layers 6 and 7 and in particular, the number of core paper webs used per layer 6, 7 can be as large as desired. In particular, the layers 6 and 7 can include so many core paper webs that the decorative molding laminate 1 has a thickness of from 4 to 20 mm and far more, after pressing. The outer layer 7 is also given a special structure according to the invention, so that the decorative laminated molding material 1 can be formed into a desired structural element. In order to fabricate the structural elements, the decorative molding laminate 1 must be deformed along defined lines. In order to make this possible, the outer layer 7 is shaped in such a way that a stack 9, 11 is always disposed along these lines, which can be removed from the outer layer 7 after the pressing so that a recess 15, 16 is formed as shown in FIG. 2, along which the decorative laminate molding material can be subsequently deformed. In order to enable such recesses 15 and 16 to be formed, the stacks 9, 11 which are located in the recesses 15, 16 to be formed later, are embedded in the outer layer 7 prior to the pressing, in such a manner that they directly adjoin the inner layer 6 and the adjacent stacks 8 and 10 or 10 and 12, respectively, but are separated therefrom by a wrapping 13 or a foil 14. As shown in FIG. 1, the stack 9 is embedded in a wrapping 13, while the stack 11 is separated from the adjoining inner layer 6 and the stacks 10 and 12 by a foil 14 which shields three of the boundary surfaces. The wrapping 13 and the foil 14 are very thin plastic foils made of polypropylene, polyamide or polyethylene. Wrappings or tubing 13 and foils 14 made of other materials can also be used, of course. They are only required to be stable at the pressing temperature of the decorative laminated molding material 1. The decorative laminated molding material 1 shown in FIG. 1 is pressed at a temperature of about 150° C. and a pressure of 1200N/cm², so that the resin is not hardened completely during the pressing. If the stack 9 or 11 is surrounded by such a wrapping or sleeve 13 or foil 14 prior to the pressing, the paper webs forming the stacks 9 and 11 are joined together, but the wrapping 13 or the foil 14 prevents joining of the stacks 9 and 11 to the inner layer 6 or to the laterally adjoining stacks 8, 10 and 12. This means, that after the decorative molding laminate 1 is pressed, the stack 9 and 11 of the outer layer 7 can be removed in a simple manner. As shown in FIG. 2, two recesses 15 and 16 are formed by the removal of the stacks 9 and 11; they extend over the entire length of the stacks 9 and 11 which had been disposed there before. In order to provide a shaped, self-supporting structural element, the decorative laminating molding material 1 can then be inserted into a molding press and bent under the action of pressure and heat along the recesses 15 and 16. The structural elements shown in FIGS. 3, 4 and 5 formed of the laminated molding material 1 shown in FIG. 2, can be produced by bending in the vicinity of the recesses 15 and 16. In spite of the thickness of more than 10 mm, structural elements 20 can be made from the decorative laminate 1 shown in FIG. 2, having rounded corners with a radius of curvature which is smaller than 2 cm. It is furthermore possible to increase the number of recesses at will, so that, for instance, a structural element 20 such as is shown in cross section in FIG. 6, can be formed.

According to the invention, it is also possible to provide the outer layer 7 with only a single stack 9, if the structural element 20 to be formed is to have only one rounded corner, such as the working surface or counter top in a kitchen which has a rounded edge pointing forward and which rests flush against a wall with the opposite edge.

In addition, the stacks 9 and 11 which are to be replaced by the recesses 15, 16 later, can also be disposed in such a way that their longitudinal axes are not parallel, but rather perpendicular to the longitudinal axes of the other stacks 8, 10 and 12 which are permanently pressed to the inner layer 6.

According to the invention, it is possible to fabricate the outer layer 7 from pre-pressed stacks 8, 9, 10, 11 and 12. In order to make the stacks, laminated molding materials, chip board or other materials can be used. In order to produce a decorative laminated molding material 1 as is shown in FIG. 1, stacks 8, 9, 10, 11 and 12 are formed from the selected material. These stacks must have a uniform height over their entire length and also must have the same height as each other, so that the side of the outer layer 7 pointing outward has no unevennesses of any kind. The stacks 8, 9, 10, 11 and 12 which are formed from any desired material, have a length and a width which are dimensioned in such a way that the inner layer 6 underneath is completely covered. In order to permit the decorative molding laminate 1 to be bent after pressing in a suitable manner for shaping structural parts, measures must also be taken in this case to make it possible to generate recesses 15, 16 after pressing, along which the deformation can be performed. For this purpose, the stacks 9 and 11 are placed in a wrapping or tubing 13 for forming the recesses 15 and 16 and are disposed between the adjacent stacks. The other alternative is to surround the boundary surfaces of the stacks 9 and 11 which adjoin the inner layer 6 or the adjacent stacks 8, 10 and 10, 12 respectively, with a foil 14 so that a connection between the stacks or the inner layer 6 is precluded during pressing. The wrapping or tubing 13 or the foil 14, is made of the materials descibed above. This ensures that the stacks 9 and 11 can be removed after the pressing of the outer layer 7 and that the recesses 15 and 16 in the outer layer 7 remain. The stacks 8, 10 and 12 of the outer layer 7 are durably connected to the inner layer 6 when the decorative laminated molding material 1 is pressed. After the pressing, the desired structural elements can be made from the decorative laminated molding material 1 as described above.

If required, the structural elements 20 can also be made in such a manner that they have a decorative layer on both sides and in such a manner that the recesses can also exhibit the corresponding decoration.

Figure 5:
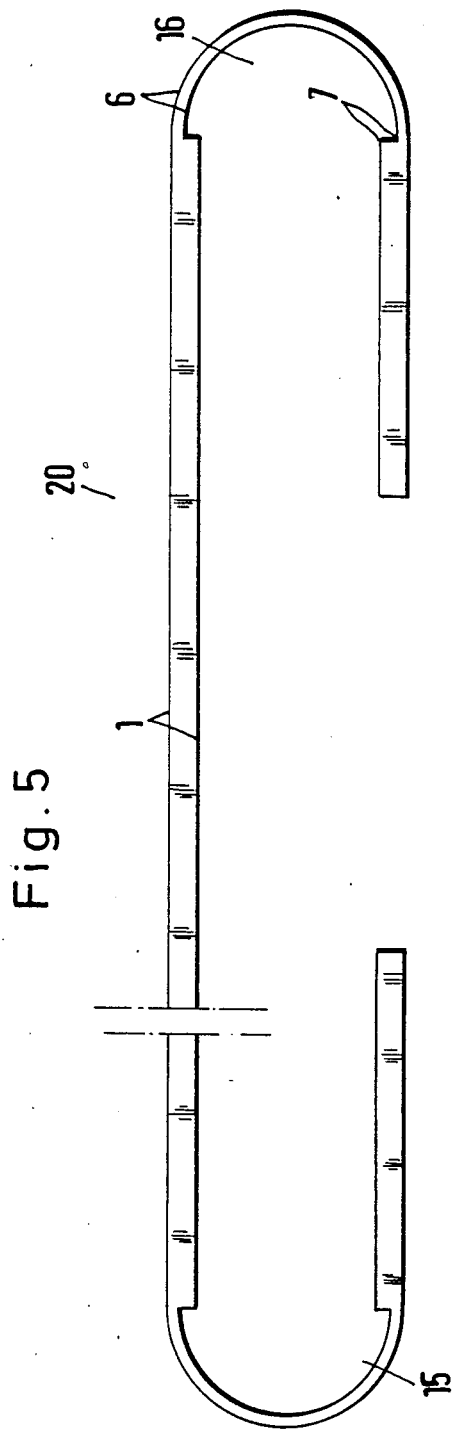
FIG. 5 is a front-elevational view of another embodiment of a structural element.
Figure 6:
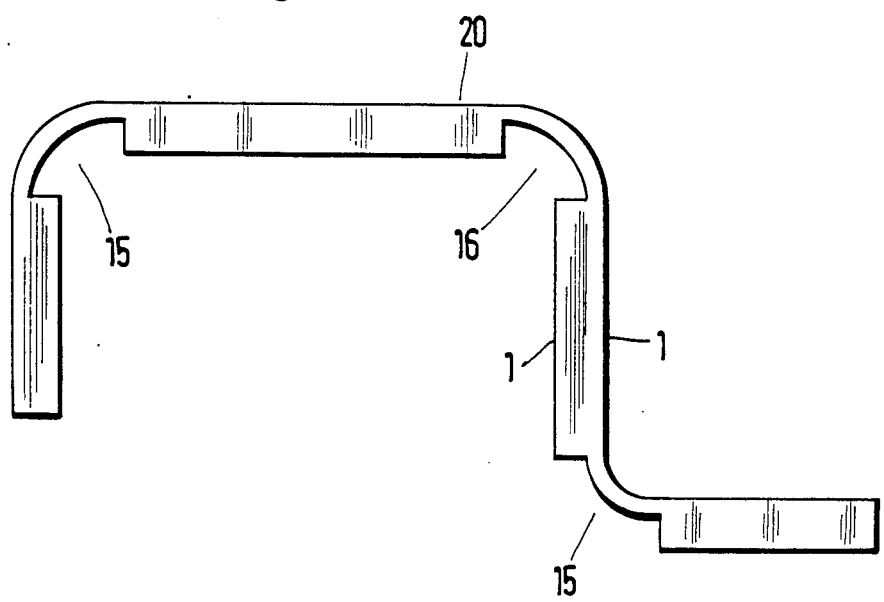
FIG. 6 is a front-elevational view of a structural element which is provided with three rounded corners.

FIG. 5 illustrates how far a decorative laminated molding material 1 can be bent in the vicinity of the recesses 15 and 16 to make rounded edges. As is also shown in FIG. 5, the wall thickness of a structural element made according to the method of the invention is determined in the vicinity of its recesses 15 and 16, by the thickness of the inner layer 6 and the covering sheet 4, the decorative sheet 3 and the transparent surface sheet 2, following it toward the outside. In order to make a structural element 20 with a thickness of about 10 mm, about 50 soda kraft paper webs impregnated with phenol resin are required for forming the inside and the outside layers 6 and 7; these are stacked in accordance with the structure shown in FIG. 1 and explained in the corresponding description. Depending on the desired thickness which the side walls of the recesses 15 and 16 are to have after pressing, the stacks 8, 9, 10, 11 and 12 are formed accordingly in the outer layer 7 in such a manner that after pressing, so much material can be removed from the outer layer 7 that the desired wall thickness remains. If necessary, the recesses 15 and 16 can be constructed in such a way that their wall thickness formed by the inner layer 6 and the decorative layer 2, 3, 4 is still only 10% of the entire original thickness of the laminated molding material 1.

I claim:

1. Method of manufacturing structural elements from decorative laminated molding materials, which comprises forming an outer layer from a plurality of mutually separate and directly adjacent stacks of soda kraft papers stacked on top of each other and impregnated with phenol resin, forming a core from an inner layer and the outer layer, separating at least one of the stacks from adjacent stacks and from the inner layer by a wrapping formed of a material from the group consisting of polypropylene, polyamide and polyethylene, placing a decorative layer on the inner layer of the core, pressing the core and the decorative layer together, forming at least one recess in the outer layer by removing at least one of the separated stacks, and deforming the structural element along the at least one recess after pressing.

2. Method according to claim 1, which comprises aligning the longitudinal axis of the at least one stack to be removed parallel to the axes of adjacent stacks.

3. Method according to claim 1, which comprises pressing and deforming the core and the decorative layer while supplying pressure and heat.

4. Method of manufacturing structural elements from decorative laminated molding materials, which comprises forming an outer layer from a plurality of mutually separate and directly adjacent stacks of soda kraft papers stacked on top of each other and impregnated with phenol resin, forming a core from an inner layer and the outer layer, separating at least one of the stacks from adjacent stacks and from the inner layer by a foil formed of a material from the group consisting of polypropylene, polyamide and polyethylene, placing a decorative layer on the inner layer of the core, pressing the core and the decorative layer together, forming at least one recess in the outer layer by removing at least one of the separated stacks, and deforming the structural element along the at least one recess after pressing.

5. Method according to claim 4, which comprises aligning the longiutidnal axis of the at least one stack to be removed parallel to the axes of adjacent stacks.

* * * * *